United States Patent
Yoshinaga

(10) Patent No.: US 11,939,160 B2
(45) Date of Patent: Mar. 26, 2024

(54) ARTICLE TRANSPORT VEHICLE

(71) Applicant: Daifuku Co., Ltd., Osaka (JP)

(72) Inventor: Kazuharu Yoshinaga, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 585 days.

(21) Appl. No.: 16/972,120

(22) PCT Filed: May 30, 2019

(86) PCT No.: PCT/JP2019/021499
§ 371 (c)(1),
(2) Date: Dec. 4, 2020

(87) PCT Pub. No.: WO2019/235347
PCT Pub. Date: Dec. 12, 2019

(65) Prior Publication Data
US 2021/0229919 A1    Jul. 29, 2021

(30) Foreign Application Priority Data
Jun. 6, 2018    (JP) ................................. 2018-108851

(51) Int. Cl.
*G06F 7/00*         (2006.01)
*B65G 1/137*        (2006.01)
*G06Q 10/08*        (2023.01)

(52) U.S. Cl.
CPC ............. *B65G 1/137* (2013.01); *G06Q 10/08* (2013.01)

(58) Field of Classification Search
CPC .. B65G 1/137; B65G 2209/04; B65G 1/1375; G06Q 50/28

USPC .................................. 700/213–216, 223–224
See application file for complete search history.

(56) References Cited

U.S. PATENT DOCUMENTS

| | | | |
|---|---|---|---|
| 2005/0149226 A1* | 7/2005 | Stevens ................ | B65G 1/1371 700/214 |
| 2013/0317642 A1* | 11/2013 | Asaria .................... | G06Q 10/08 700/216 |
| 2017/0225336 A1* | 8/2017 | Deyle ....................... | G01V 8/10 |
| 2018/0342031 A1 | 11/2018 | Tada et al. | |
| 2018/0354719 A1* | 12/2018 | Hoffman .................. | B65G 1/10 |

FOREIGN PATENT DOCUMENTS

| | | | |
|---|---|---|---|
| EP | 3412602 A1 | | 12/2018 |
| JP | 200085924 A | | 3/2000 |
| JP | 2000142927 A | * | 5/2000 |
| JP | 2000142927 A | | 5/2000 |
| JP | 2002114338 A | | 4/2002 |

(Continued)

*Primary Examiner* — Yolanda R Cumbess
(74) *Attorney, Agent, or Firm* — The Webb Law Firm

(57) ABSTRACT

An article transport vehicle (3) includes: a travel unit (11) that travels to a set position (P1) that has been set so as to correspond to each of a plurality of storage units (1) configured to store an article (W); a support portion (12) configured to support the article (W); a lighting unit (13) that emits light; and a control unit that controls the travel unit (11) and the lighting unit (13). The control unit executes a travel control that controls the travel unit (11) such that the travel unit (11) travels to the set position (P1) that has been set so as to correspond to a target storage unit (1A), and a lighting control that controls the lighting unit (13) so as to emit light to a lighting position (P2) that corresponds to the target storage unit (1A).

11 Claims, 7 Drawing Sheets

(56) References Cited

FOREIGN PATENT DOCUMENTS

| | | | |
|---|---|---|---|
| JP | 2008247546 | A | 10/2008 |
| WO | 2017135197 | A1 | 8/2017 |
| WO | 2018047355 | A1 | 3/2018 |

\* cited by examiner

ARTICLE TRANSPORT VEHICLE

CROSS-REFERENCE TO RELATED APPLICATIONS

This application is the United States national phase of International Application No. PCT/JP2019/021499 filed May 30, 2019, and claims priority to Japanese Patent Application No. 2018-108851 filed Jun. 6, 2018, the disclosures of which are hereby incorporated by reference in their entirety.

BACKGROUND OF THE INVENTION

Field of the Invention

The present invention relates to an article transport vehicle provided with a support portion that supports an article.

Description of Related Art

Following is a description of background art. In the following description, reference signs or names in parentheses are the reference signs or names in the prior art document. An example of such an article transport vehicle is described in JP 2008-247546A (Patent Document 1). The article transport vehicle (picking work cart) of Patent Document 1 is provided in a picking facility. In this picking facility, picking work is performed in which the article transport vehicle is moved by a pushing/pulling operation of a worker to move the article transport vehicle near to a storage unit (an article storage unit 5) of a target storage shelf (3), and then an article is removed from the storage unit of the storage shelf and supported in a support portion (a container 8) of the article transport vehicle. In the above-described picking facility, a picking display device (6) is installed for each of a plurality of storage units. This picking display device is provided with a display/complete button (6b), and by lighting the display/complete button corresponding to the storage unit from which an article is to be removed, the storage unit from which the article is to be removed is indicated to the worker.
Patent Document 1: JP 2008-247546A

SUMMARY OF THE INVENTION

As described above, by lighting the display/complete button, the worker can easily recognize the storage unit from which the article is to be removed, and thus it is possible to suppress mistakes in the picking work, but it is necessary to provide a picking display device for each storage unit. Therefore, the manufacturing cost of the entire picking facility in which the article transport vehicle is installed is high.

Consequently, realization of an article transport vehicle that can indicate a position corresponding to a target storage unit, while suppressing the manufacturing cost of an entire facility, is desired.

An article transport vehicle according to the present disclosure is provided with a travel unit that travels to a set position that has been set so as to correspond to each of a plurality of storage units configured to store an article; a support portion configured to support an article; a lighting unit that emits light; and a control unit that controls the travel unit and the lighting unit; and with the storage unit where an article to be supported in the support portion is being stored serving as a target storage unit, the control unit executes a travel control that controls the travel unit such that the travel unit travels to the set position that has been set so as to correspond to the target storage unit, and a lighting control that controls the lighting unit so as to emit light to a lighting position that corresponds to the target storage unit.

According to this configuration, by the control unit executing the travel control, the travel unit travels to the set position, and by the control unit executing the lighting control, the lighting unit emits light to the lighting position that corresponds to the target storage unit. By emitting light to the lighting position in this way, it is possible to use light to indicate the target storage unit. Therefore, in the picking work, it is possible to suppress the occurrence of a mistake in which a worker removes an article from a storage unit other than the target storage unit. Also, by providing the lighting unit in the article transport vehicle, it is not necessary to provide an apparatus that indicates the storage target unit for each of the plurality of storage units. Therefore, the cost of the entire facility where the article transport vehicle is installed can be kept low.

DETAILED DESCRIPTION OF PREFERRED EMBODIMENTS

1. Embodiment

An embodiment of an article transport vehicle used in a picking facility will be described with reference to the drawings.

Figure 1:
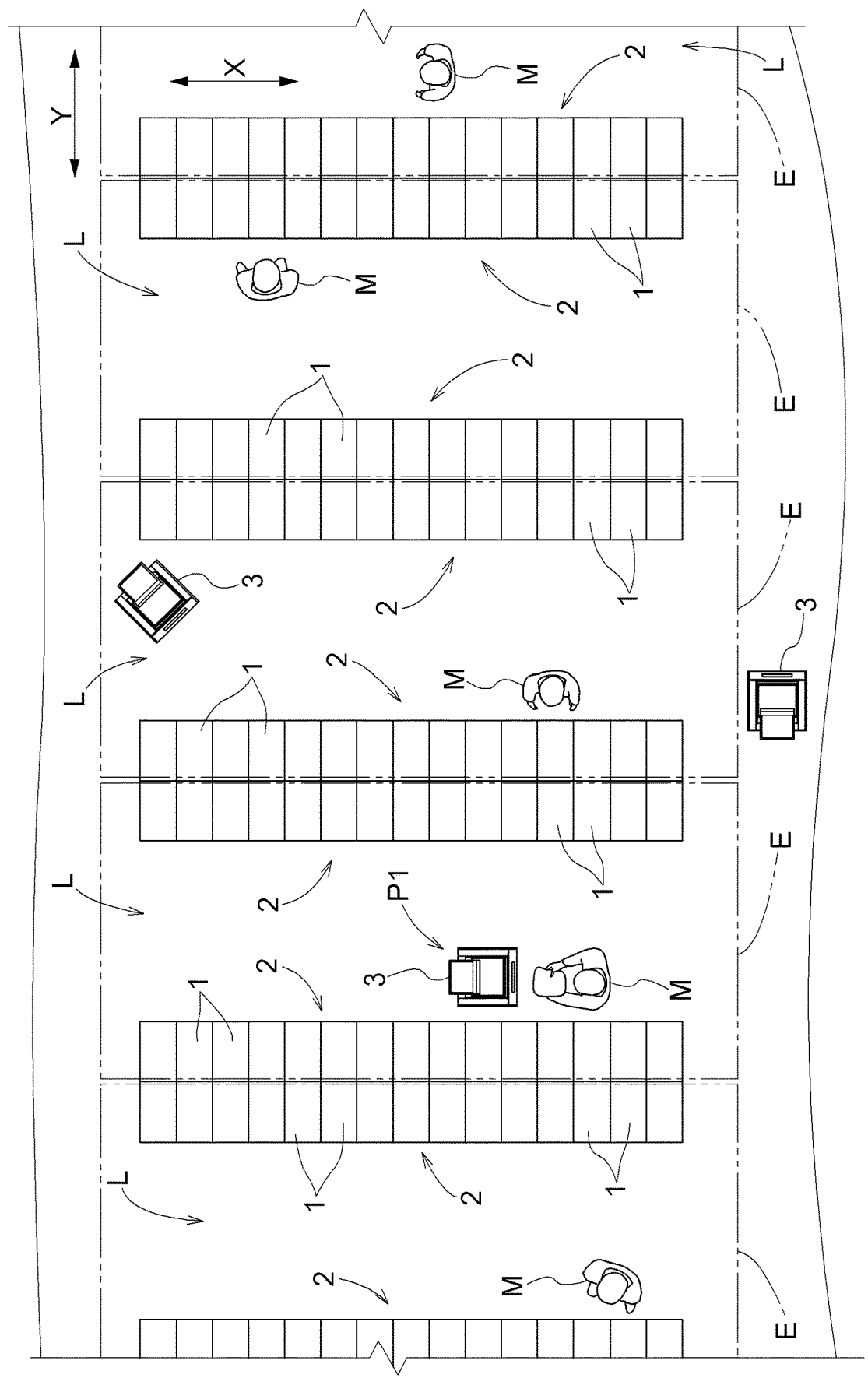
FIG. 1 is a plan view of a picking facility.
Figure 2:
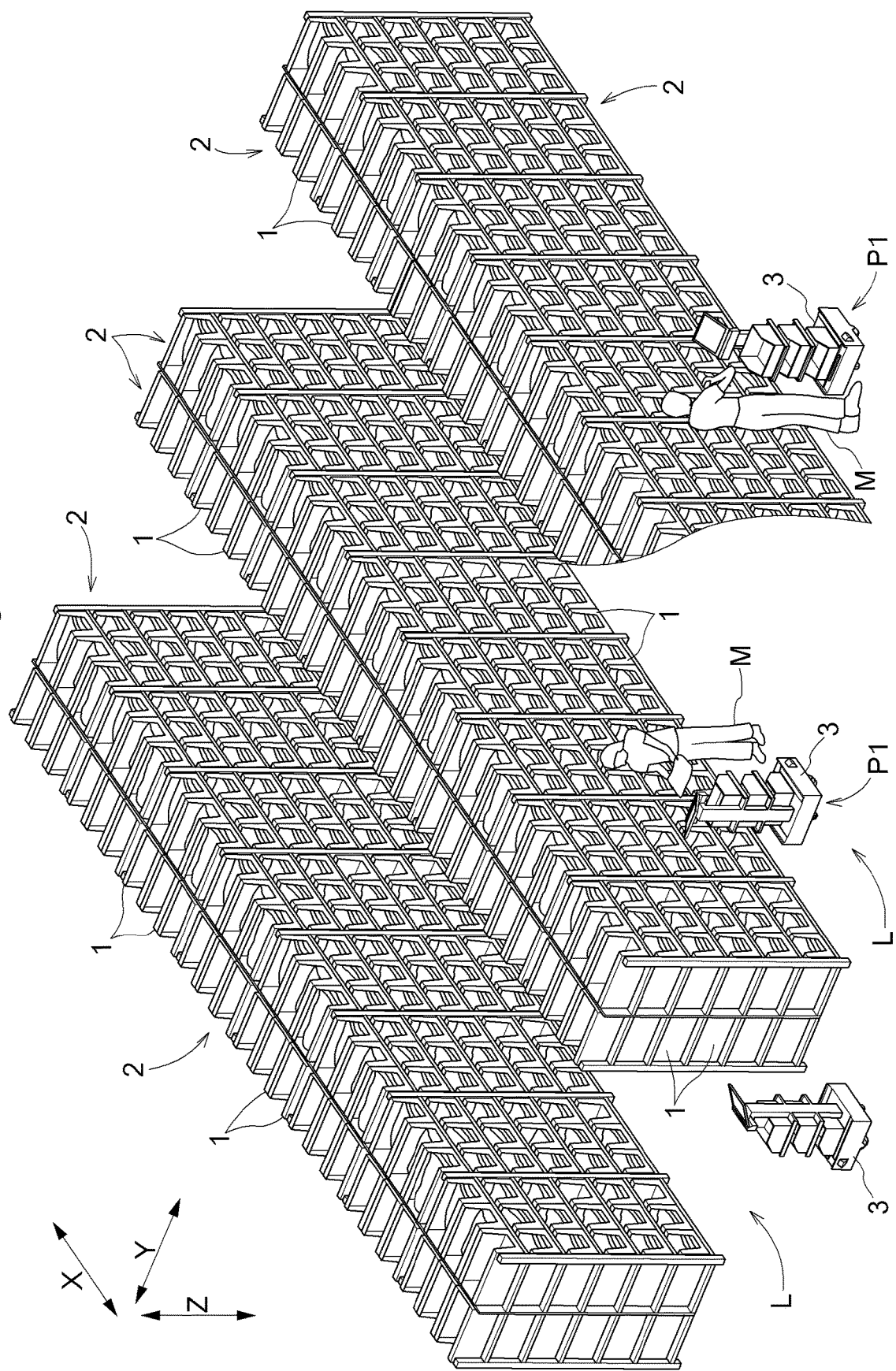
FIG. 2 is a perspective view of the picking facility.

As shown in FIGS. 1 and 2, the picking facility includes article storage shelves 2 provided with a plurality of storage units 1 that store articles W, article transport vehicles 3 that travel on a floor F, and a control apparatus H (see FIG. 7) that manages the articles W stored on the article storage shelves 2 and controls the article transport vehicles 3.

Figure 4:
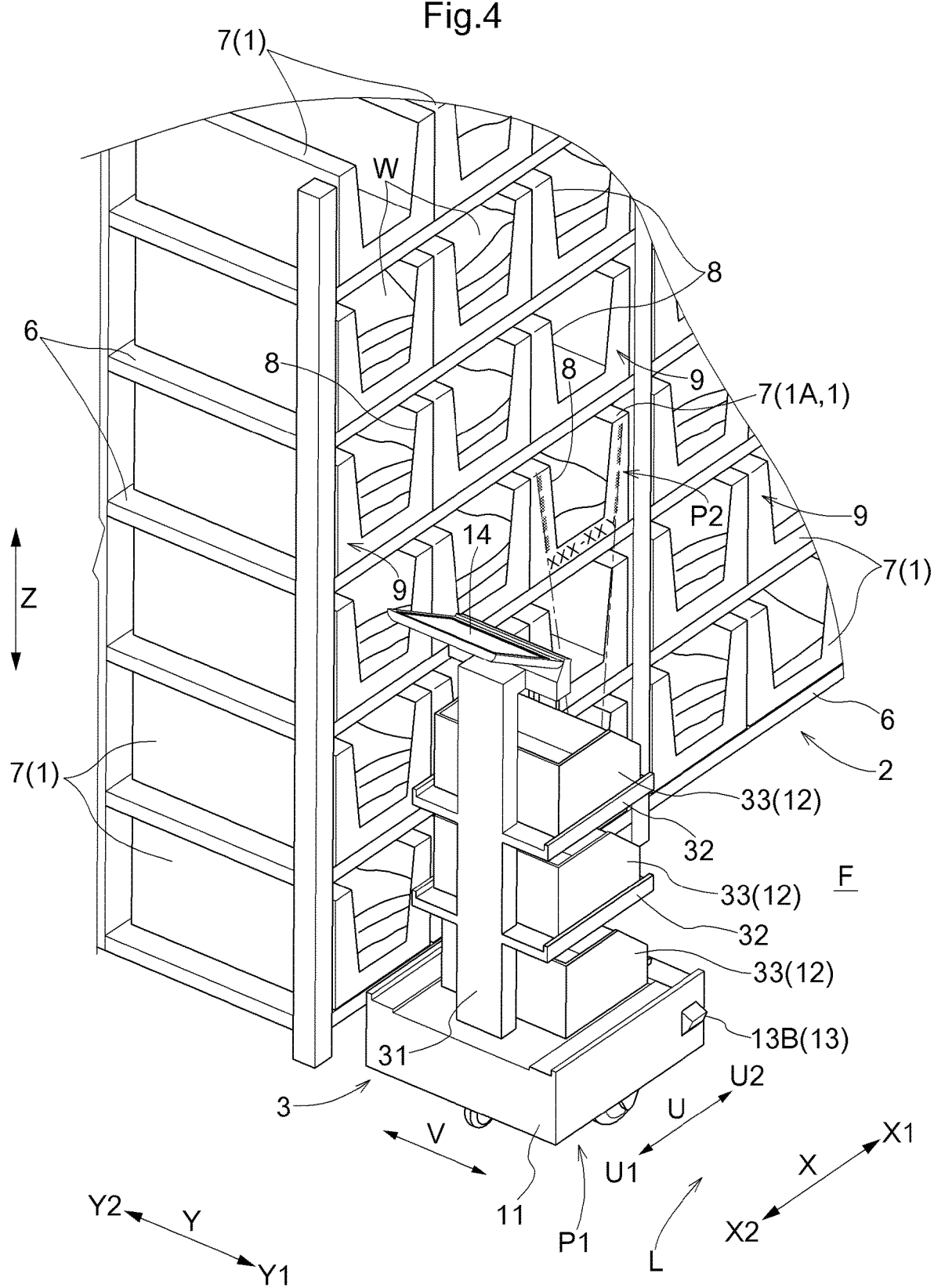
FIG. 4 is a perspective view showing a state in which a lighting unit is emitting light on a storage unit.

In the following description of the article storage shelves 2 and the article transport vehicles 3, in a vertical direction Z view in which these are viewed in a vertical direction Z, the direction in which the storage units 1 of the article storage shelves 2 are lined up is referred to as a first direction X (arrangement direction), and a direction orthogonal to the first direction X is referred to as a second direction Y Also, as shown in FIG. 4, one side in the first direction X is referred to as a first direction first side X1, and the opposite side thereto is referred to as a first direction second side X2. Further, in the second direction Y, a side where the storage units 1 exist with respect to the center of a work passageway L is referred to as a storage unit side Y2, and the opposite side thereto (the side where the work passageway L exists with respect to the storage units 1) is referred to as a passageway side Y1. With respect to an article transport vehicle 3, a direction in the forward travel direction when the article transport vehicle 3 travels straight forward is referred to as a front-rear direction U, and a direction orthogonal to the front-rear direction U in the horizontal plane is referred to as a width direction V. Also, the forward travel direction side of the article transport vehicle 3 in the front-rear direction U is referred to as a front side U1, and the opposite side thereto is referred to as a rear side U2.

Each article storage shelf 2 includes a plurality of storage units 1 in a state lined up in the vertical direction Z and the first direction X. More specifically, the article storage shelf 2 includes a plurality of shelf boards 6 in a state spaced apart in the vertical direction Z, and on the plurality of shelf boards 6, a plurality of storage containers 7 are placed in a state lined up in the first direction X. In this way, a storage unit 1 is formed by each of the plurality of storage containers 7 provided on the article storage shelf 2. A plurality of types of articles W are stored organized by type in the storage containers 7 (the storage units 1), and one type of article W is stored in one storage container 7.

Each storage container 7 has an opening face 9 having an opening portion 8 where an article W is inserted or removed. The storage container 7 is installed on the article storage shelf 2 such that the opening face 9 faces the passageway side Y1. Therefore, each storage unit 1 formed by this storage container 7 includes an opening face 9 having an opening portion 8 where an article W is inserted or removed. Also, the plurality of storage units 1 provided on one article storage shelf 2 are arranged with the opening faces 9 facing in the same direction.

As shown in FIG. 1, the area where the article storage shelves 2 are installed is divided into a plurality of areas E. Also, in the present embodiment, a worker M in charge is deployed in each of the plurality of areas E. The worker M, in the area E in which that worker M is in charge, performs picking work of transferring articles W from the article storage shelf 2 to the article transport vehicle 3, and storage work of transferring articles W from the article transport vehicle 3 to the article storage shelf 2. Note that the relationship between the number of areas E and the number of workers M can be arbitrarily changed. For example, a plurality of workers M may be deployed in one area E, or one worker M may be in charge of a plurality of areas E.

Figure 7:
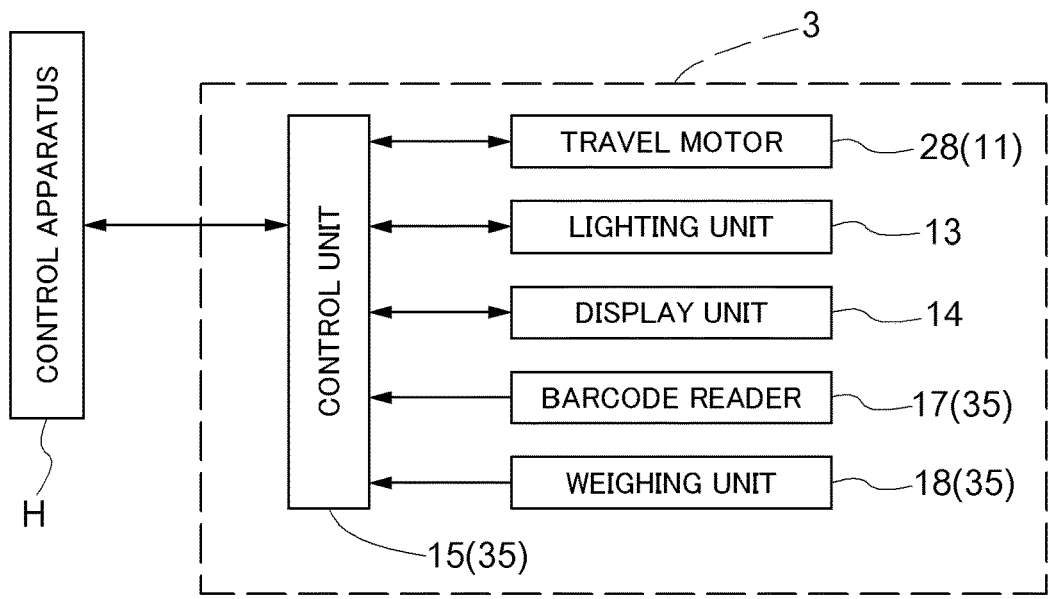
FIG. 7 is a control block diagram.

The control apparatus H shown in FIG. 7 stores stored article information, which is information indicating the number of articles W stored in a storage unit 1 and the type of articles W stored in the storage unit 1.

The control apparatus H is configured to, when a picking command is output from a higher-level controller, transmit picking information to a control unit 15 of the article transport vehicle 3 based on the picking command and the stored article information. The picking information is information indicating the position of the storage unit 1 (a target storage unit 1A) from which articles W are to be removed by the picking work, and information indicating the type and number of articles W to be removed from the storage unit 1. Also, the control apparatus H is configured to, when a storage command is output from a higher-level controller, transmit storage information to the control unit 15 of the article transport vehicle 3 based on the storage command and the stored article information. The storage information is information indicating the position of the storage unit 1 (the target storage unit 1A) to which articles W are to be stored by the storage work, and information indicating the type and number of articles W to be stored in the storage unit 1.

In the following description of the article transport vehicle 3, as shown in FIG. 4, directions are defined and described based on a state in which the article transport vehicle 3 is stopped. In the present embodiment, the article transport vehicle 3 basically stops in a state in which the front-rear direction U of the article transport vehicle 3 follows the first direction X, on the storage unit side Y2 relative to the center of the work passageway L. In the state shown in FIG. 4, the front side U1 of the article transport vehicle 3 faces the first direction second side X2, the rear side U2 of the article transport vehicle 3 faces the first direction first side X1, the right side of the article transport vehicle 3 faces the storage unit side Y2, and the left side of the article transport vehicle 3 faces the passageway side Y1. Also, the first direction first side X1 corresponds to a working side where the worker M performs work relative to a support portion 12.

Figure 3:
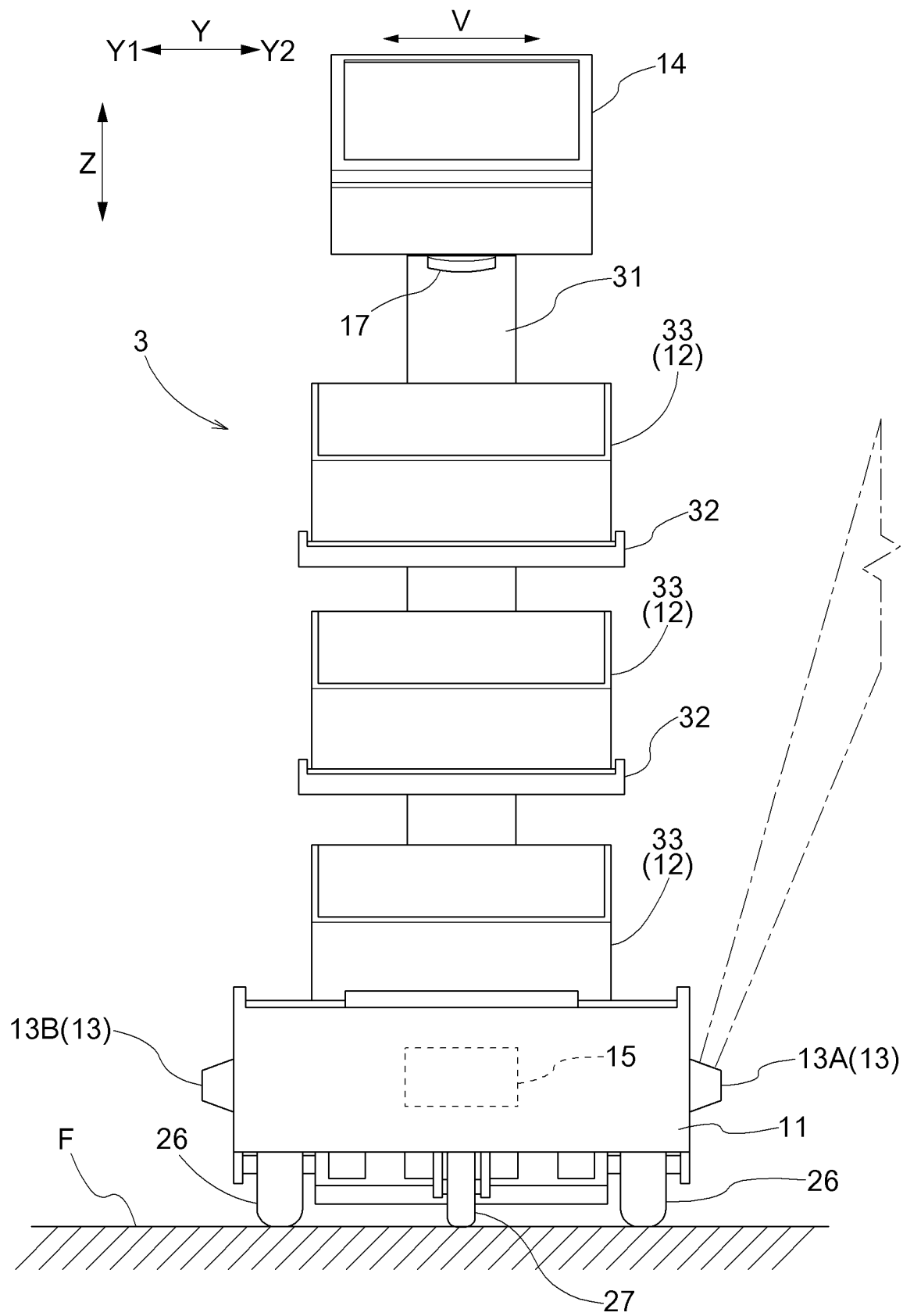
FIG. 3 is a rear view of an article transport vehicle.

As shown in FIG. 3, the article transport vehicle 3 includes a travel unit 11 that travels on the floor F, support portions 12 that support articles W, a lighting unit 13 that emits light, a display unit 14 that displays picking information and storage information, and a control unit 15 that controls the travel unit 11, the lighting unit 13, and the display unit 14. Also, as shown in FIG. 7, the article transport vehicle 3 includes a barcode reader 17 that reads a barcode displayed on an article W, and a weighing unit 18 that measures the weight of articles W supported by the support portions 12.

The travel unit 11 includes a pair of travel wheels 26 arranged in the second direction Y, driven wheels 27 installed on both sides in the first direction X relative to the pair of travel wheels 26, and a travel motor 28 that rotationally drives the travel wheels 26 (see FIG. 7). The travel unit 11 travels forward by rotating both of the pair of travel wheels 26 in the forward rotation direction with the travel motor 28, and travels rearward by rotating both of the pair of travel wheels 26 in the reverse rotation direction with the travel motor 28. Also, the travel unit 11 travels in a turning manner by rotating the pair of travel wheels 26 at different rotation speeds with the travel motor 28.

A support column 31 is erected on the travel unit 11. In the illustrated example, two support bases 32 are supported in a state lined up in the vertical direction Z at an intermediate position in the vertical direction Z of the support column 31. Also, the display unit 14 is supported at the upper end of the support column 31. Transport containers 33 are supported by the travel unit 11 and each of the two support bases 32, and these transport containers 33 correspond to the support portions 12 that support the articles W.

The display unit 14 is configured to be capable of displaying picking information and storage information. The display unit 14 has a touch panel and is configured to be operable by a worker M. The display unit 14 is installed such that a display screen that displays various information is on the first direction first side X1 and faces upward.

The lighting unit 13 emits light in a direction that, when viewed in the vertical direction Z, is inclined with respect to the second direction Y, and is directed more toward the first direction first side X1 as the light moves to the storage unit side Y2. The lighting unit 13 is configured so as to emit light to a lighting position P2 corresponding to the target storage unit 1A, and the lighting position P2 is set on the opening face 9 of the target storage unit 1A. In the present embodiment, the lighting unit 13 emits visible light that the worker M can perceive with the naked eye.

The lighting unit 13 includes a first light projecting apparatus 13A that emits light to the opening face 9 of a storage unit 1 positioned on the right side with respect to the article transport vehicle 3 toward the first direction second side X2, and a second light projecting apparatus 13B that emits light to the opening face 9 of a storage unit 1 positioned on the left side with respect to the article transport vehicle 3 toward the first direction second side X2. The first light projecting apparatus 13A is installed at the right side end portion of the rear portion of the travel unit 11, and emits light obliquely to the right rear. The second light projecting apparatus 13B is installed at the left side end portion of the rear portion of the travel unit 11, and emits light obliquely to the left rear. The first light projecting apparatus 13A and the second light projecting apparatus 13B are configured such that the angle of emitting light in the vertical direction Z (in other words, the light emission angle with respect to the vertical direction Z) can be changed, and are configured such that light can be emitted to the opening face 9 of any storage unit 1 among the plurality of storage units 1 lined up in the vertical direction Z. Further, the first light projecting apparatus 13A and the second light projecting apparatus 13B are configured such that it is possible to adjust the angle of emitting light in the front-rear direction U (the first direction X) of the article transport vehicle 3 (in other words, the light emission angle with respect to the front-rear direction U), in case an error occurs in the stop position of the article transport vehicle 3. Note that FIGS. 3 and 4 show a state in which the first light projecting apparatus 13A is emitting light toward the target storage unit 1A.

Figure 5:
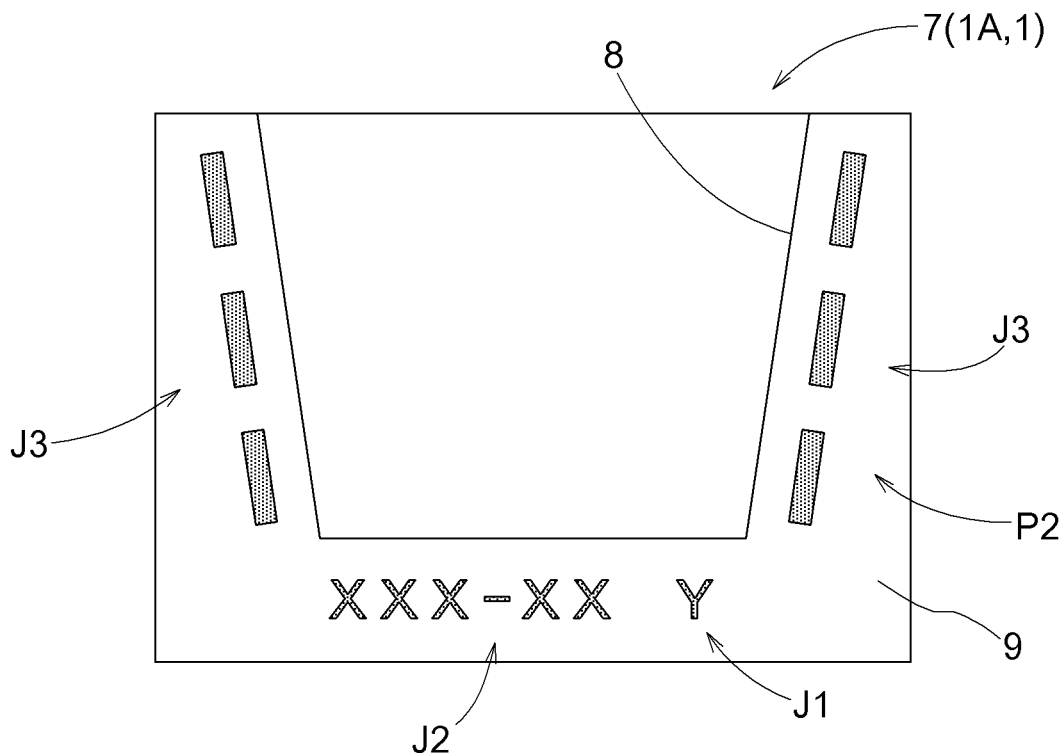
FIG. 5 is a front view of a target storage unit showing a state in which the lighting unit is emitting light based on picking information.
Figure 6:
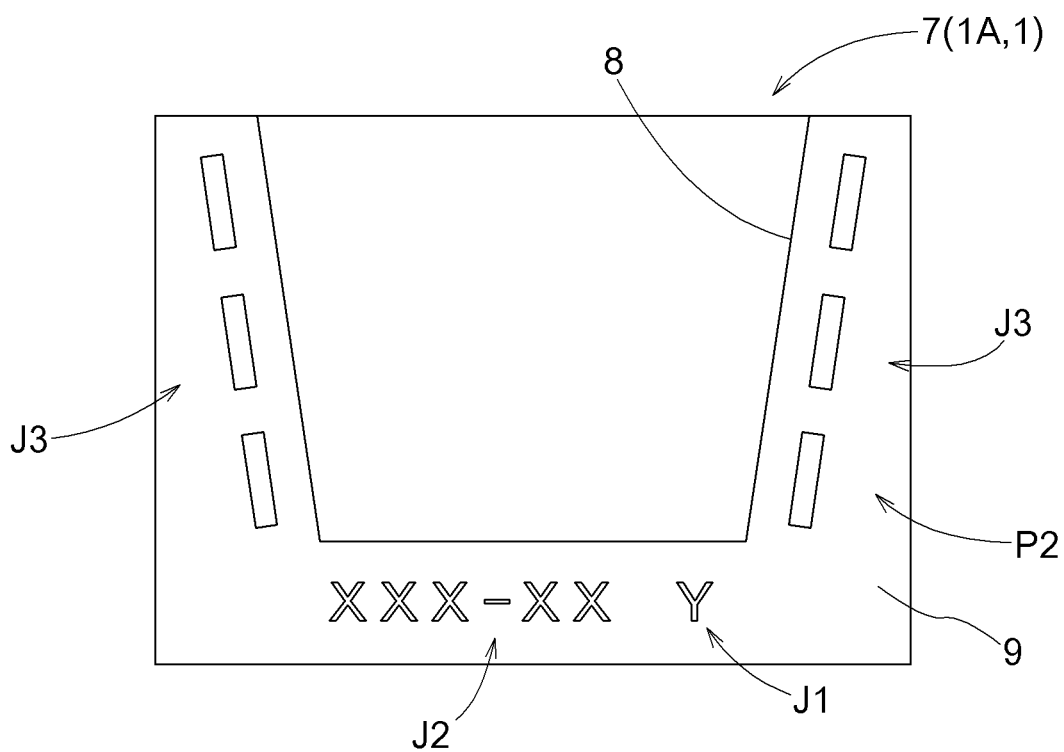
FIG. 6 is a front view of a target storage unit showing a state in which the lighting unit is emitting light based on storage information.

As shown in FIGS. 5 and 6, the lighting unit 13 is configured to be capable of emitting light so as to display number information indicating a number, position information indicating the position of the storage unit 1, and storage type information at the lighting position P2. In the present embodiment, the position information includes information indicating the position (bay) of the target storage unit 1A in the first direction X, and information indicating the position (level) of the target storage unit 1A in the vertical direction Z. In addition to this bay and level information, the position information may include information indicating the work passageway L (aisle) where the target storage unit 1A exists. The storage type information is information indicating whether the target storage unit 1A is a storage unit 1 that is a removal source (a storage unit 1 from which an article W is to be removed in picking work) or a storage unit 1 that is a storage destination (a storage unit 1 where an article W is to be stored in storage work). In the present embodiment, the lighting unit 13 is configured to be capable of emitting light of a plurality of colors, and as shown in FIGS. 5 and 6, storage type information is displayed by changing the color of light that is emitted to the lighting position P2 between a case where the target storage unit 1A is a storage unit 1 that is a removal source and a case where the target storage unit 1A is a storage unit 1 that is a storage destination. In a case where the target storage unit 1A is a storage unit 1 that is a removal source, the number information indicates the number of articles W to be removed from that target storage unit 1A, and in a case where the target storage unit 1A is a storage unit 1 that is a storage destination, the number information indicates the number of articles W to be stored in that target storage unit 1A.

The control unit 15, based on picking information and storage information that has been transmitted from the control apparatus H, executes a first travel control (corresponding to the travel control) and a second travel control that control the travel unit 11, a display control that controls the display unit 14, a lighting control that controls the lighting unit 13, and a detection control that detects that work has been completed.

The first travel control is a control that controls the travel unit 11 such that the travel unit 11 travels to a set position P1 that has been set so as to correspond to the target storage unit 1A. The set position P1 is set on the passageway side Y1 and the first direction first side X1 or the first direction second side X2 in the first direction X with respect to the target storage unit 1A. In the example shown in FIG. 4, the article transport vehicle 3 is stopped at the set position P1 that has been set on the passageway side Y1 and the first direction second side X2 with respect to the target storage unit 1A. The second travel control is a control that controls the travel unit 11 such that the travel unit 11 travels to a work position (not shown). The work position is set so as to correspond to a location for performing work of unloading an article W supported by a support portion 12 from the article transport vehicle 3 by picking work, and work of supporting an article W to be stored in a storage unit 1 in a support portion 12 by storage work.

The display control is control of the display unit 14 so as to cause the display unit 14 to display number information indicating the number of articles W to be removed from or stored in the target storage unit 1A, type information indicating the type of articles W to be removed from or stored in the target storage unit 1A, position information indicating the position of the storage unit 1A, storage type information, and container information indicating a container among the plurality of transport containers 33 where the articles W are to be removed or stored. When executing the display control based on picking information, the control unit 15 displays the position of the target storage unit 1A, and number information and type information of the articles W to be removed from the target storage unit 1A, in the display unit 14, and also displays a character string or mark indicating picking work as storage type information in the display unit 14. Also, when executing the display control based on storage information, the control unit 15 displays the position of the target storage unit 1A, and number information and type information of the articles W to be stored in the target storage unit 1A, in the display unit 14, and also displays a character string or mark indicating storage work as storage type information in the display unit 14.

The lighting control controls the lighting unit 13 so as to emit light to the lighting position P2 corresponding to the target storage unit 1A. In the present embodiment, in the lighting control, the control unit 15 controls the lighting unit 13 so as to emit light to the lighting position P2 so as to display the number information indicating the number of articles W to be removed from or stored in the target storage unit 1A in a first region J1, and display the position information indicating the position of the storage unit 1A in a second region J2, and display the storage type information in a third region J3. Also, when executing the lighting control based on picking information, the control unit 15 controls the lighting unit 13 so as to indicate the number of articles W to be removed from the target storage unit 1A as the number information, and when executing the lighting control based on storage information, the control unit 15 controls the lighting unit 13 so as to indicate the number of articles W to be stored in the target storage unit 1A as the number information. Also, in this example, as position information, the control unit 15 displays a numeral indicating the position (bay) of the target storage unit 1A in the first direction X, and a numeral indicating the position (level) of the target storage unit 1A in the vertical direction Z. Also, in this example, the control unit 15 controls the lighting unit 13 so as to display storage type information at the lighting position P2 by changing the color of light that is emitted by the lighting unit 13 between a case where the lighting control is executed based on picking information and a case where the lighting control is executed based on storage information. Note that, rather than changing the color of light that is emitted by the lighting unit 13 according to the storage type, a configuration may also be adopted in which a character string or mark indicating the storage type is displayed at the lighting position P2 as storage type information.

The control unit 15 is configured so as to be capable of, by reading a barcode of an article W with the barcode reader 17, discriminating the type of the article W whose barcode was read. The control unit 15 determines that an article W of the type discriminated by reading the barcode of the article W with the barcode reader 17 is an article W to be loaded to/unloaded from a support portion 12, and when this discriminated type of article W differs from the type of article W indicated by the type information, the control unit 15 causes information indicating an error to be displayed in the display unit 14.

Also, weight information indicating the weight of articles W is stored in the control unit 15, and the weighing unit 18 is configured to be capable of measuring the weight of the plurality of the support portions 12 separately, or is configured to be capable of measuring the total weight of the plurality of support portions 12. The control unit 15, based on a change in the weight measured by the weighing unit 18 and weight information of an article W to be supported by a support portion 12, discriminates whether or not the number indicated by the number information of articles W of the type indicated by the type information have been correctly loaded to/unloaded from a designated support portion 12. When determined that a different type of article W has been loaded to/unloaded from a support portion 12, or when determined that a different number of articles W than the number indicated by the number information have been loaded to/unloaded from a support portion 12, or when determined that an article W has been loaded to/unloaded from a different support portion 12 than the designated support portion 12, the control unit 15 causes information indicating an error to be displayed in the display unit 14.

Also, in the detection control, when the type of article W discriminated based on the information read by the barcode reader 17 matches the type of article W indicated by the type information, and it has been determined that the number indicated by the number information of articles W of the type indicated by the type information have been correctly loaded to/unloaded from a designated support portion 12, the control unit 15 discriminates that articles W have been correctly loaded to/unloaded from the support portion 12. More specifically, in detection control based on picking information, the control unit 15 discriminates that articles W have been correctly supported in the support portions 12, and in detection control based on storage information, the control unit 15 discriminates that articles W have been correctly unloaded from the support portions 12. In the manner described above, a detection unit 35 that detects that an article W that has been removed from the target storage unit 1A has been correctly supported in a support portion 12 is configured by the control unit 15, the barcode reader 17, and the weighing unit 18.

Figure 8:
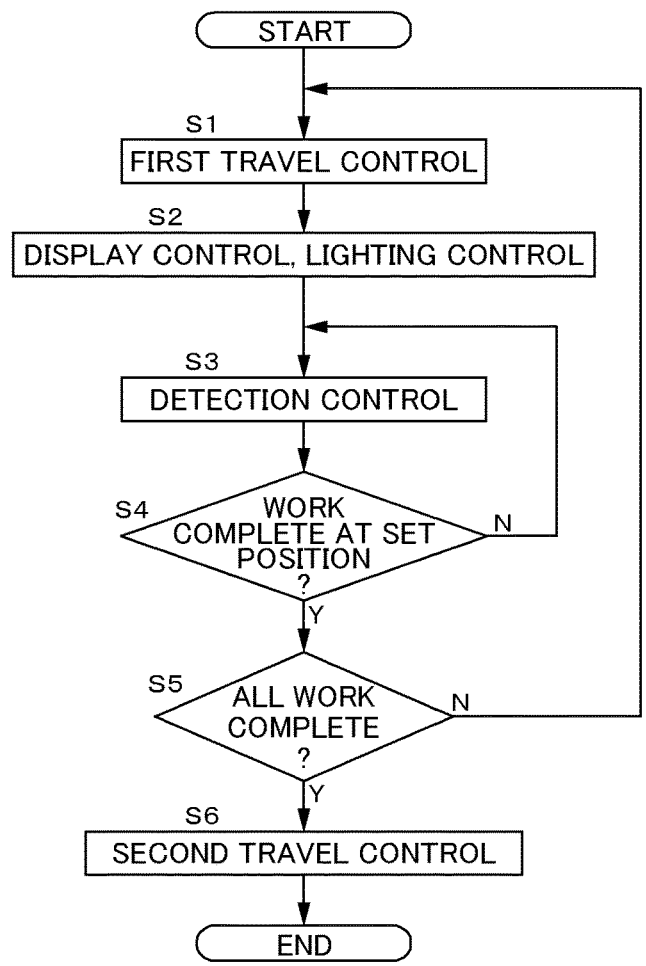
FIG. 8 is a control flowchart of a control unit.

Next, control by the control unit 15 will be described based on the flowchart shown in FIG. 8. When picking information or storage information is received from a higher-level controller, the control unit 15 executes the first travel control to cause the travel unit 11 to travel to the set position P1 that corresponds to the target storage unit 1A designated by that picking information or storage information (in a case where a plurality of target storage units 1A have been designated, one among those target storage units 1A) (S1). Afterward, in a state in which the travel unit 11 is positioned at the set position P1, the control unit 15 executes the display control and also executes the lighting control (S2). Then, by the detection control, the control unit 15 discriminates whether or not work at one set position P1 is completed (whether or not an article W has been correctly loaded to/unloaded from a support portion 12) (S3, S4). When work at one set position P1 is completed, if work for all of the plurality of target storage units 1A designated by the picking information or the storage information is completed (S5: Yes), then the second travel control is executed (S6). On the other hand, when work at one set position P1 is completed, if there is a target storage unit 1A for which work is not completed among the plurality of target storage units 1A designated by the picking information or the storage information (S5: No), a next instance of the first travel control is executed to cause the travel unit 11 to travel to a set position P1 that corresponds to the target storage unit 1A for which work is not completed (S1). Next, the control unit 15 starts the lighting control when execution of the first travel control ends, and ends the lighting control when detection is performed by the detection unit 35.

2. Other Embodiments

Next is a description of other embodiments of the article transport vehicle.

Figure 9:
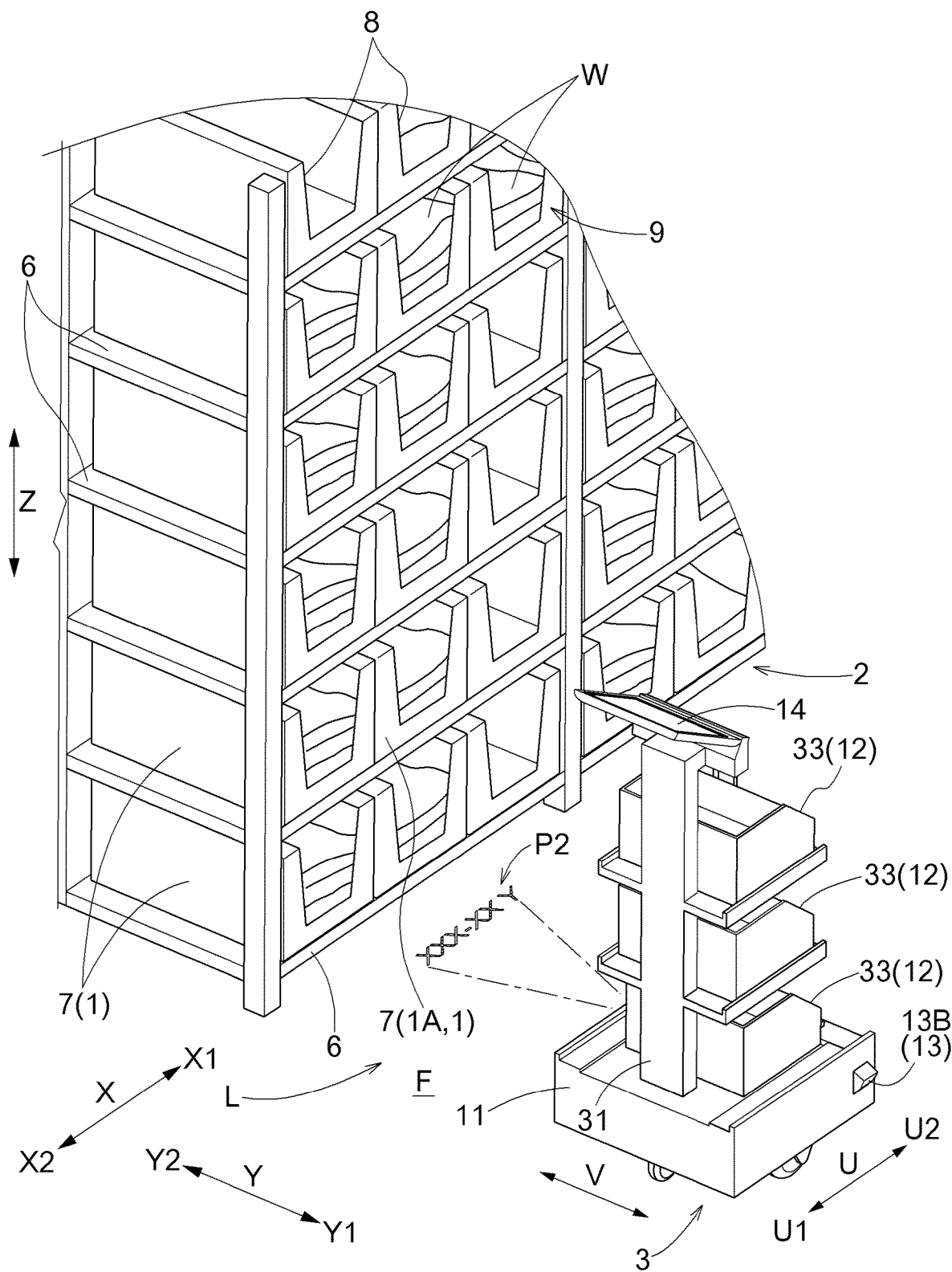
FIG. 9 is a perspective view showing a state in which a lighting unit according to another embodiment is emitting light on a floor.

(1) In the above embodiment, the lighting position P2 is set on the opening face 9 of the target storage unit 1A, but the lighting position P2 may be changed as appropriate. For example, as shown in FIG. 9, the lighting position P2 may be set on the floor F where the travel unit 11 travels. In this case, in the lighting control, it is particularly preferable to display a character string, a mark, or the like for clearly indicating the position of the target storage unit 1A in the vertical direction as the position information indicating the position of the target storage unit 1A.

(2) In the above embodiment, the position information, the number information, and the storage type information are displayed at the lighting position P2, but a configuration may also be adopted in which only a part of the position information, the number information, and the storage type information is displayed at the lighting position P2.

(3) In the above embodiment, in addition to a storage unit 1 that is a removal source, a storage unit 1 that is a storage destination can also serve as a target storage unit 1A, but a configuration may also be adopted in which only a storage unit 1 that is a removal source serves as a target storage unit 1A.

(4) In the above embodiment, the lighting control and the display control are started when the travel control ends, but a configuration may also be adopted in which one or both of the lighting control and the display control are started before the travel control ends. That is, a configuration may be adopted in which, for example, the display control is started at the same time that the travel control is started or is started during execution of the travel control, or a configuration may be adopted in which the lighting control is started during execution of the travel control.

(5) In the above embodiment, the lighting unit 13 emits light in a direction that, when viewed in the vertical direction Z, is inclined with respect to the second direction Y, but a configuration may also be adopted in which the lighting unit 13 emits light in a direction that, when viewed in the vertical direction Z, is parallel to the second direction Y.

(6) In the above embodiment, the lighting unit 13 emits visible light, but a configuration may also be adopted in which the lighting unit 13 emits invisible light (ultraviolet rays, infrared rays, or the like). In this case, at the lighting position P2, a member containing a phosphor that emits light by invisible light may be installed, or a paint containing a phosphor may be applied.

(7) It should be noted that the configurations disclosed in each of the above embodiments can be applied in combination with the configurations disclosed in other embodiments as long as no contradiction arises. Regarding those other configurations as well, the embodiments disclosed in the present specification are merely examples in all respects. Accordingly, various modifications can be made as appropriate in a range that does not depart from the gist of the present disclosure.

3. Summary of the Above Embodiments

Following is a summary of the article transport vehicle described above.

An article transport vehicle is provided with a travel unit that travels to a set position that has been set so as to correspond to each of a plurality of storage units configured to store an article; a support portion configured to support an article; a lighting unit that emits light; and a control unit that controls the travel unit and the lighting unit; and with the storage unit where an article to be supported in the support portion is being stored serving as a target storage unit, the control unit executes a travel control that controls the travel unit such that the travel unit travels to the set position that has been set so as to correspond to the target storage unit, and a lighting control that controls the lighting unit so as to emit light to a lighting position that corresponds to the target storage unit.

According to this configuration, by the control unit executing the travel control, the travel unit travels to the set position, and by the control unit executing the lighting control, the lighting unit emits light to the lighting position that corresponds to the target storage unit. By emitting light to the lighting position in this way, it is possible to use light to indicate the target storage unit. Therefore, in picking work, it is possible to suppress the occurrence of a mistake in which a worker removes an article from a storage unit other than the target storage unit. Also, by providing the lighting unit in the article transport vehicle, it is not necessary to provide an apparatus that indicates a storage target unit for each of the plurality of storage units. Therefore, the cost of the entire facility where the article transport vehicle is installed can be kept low.

Here, it is suitable to adopt a configuration in which the lighting unit is configured to be capable of emitting light so as to display number information indicating a number at the lighting position, and the control unit, in the lighting control, controls the lighting unit so as to display number information indicating a number of articles to be removed from the target storage unit at the lighting position.

According to this configuration, by the control unit executing the lighting control, number information indicating the number of articles to be removed is displayed at the lighting position corresponding to the target storage unit. Therefore, in picking work, it is possible to suppress the occurrence of a mistake in which a worker removes an incorrect number of articles from the target storage unit.

Also, it is suitable to adopt a configuration in which each of the storage units is provided with an opening face having an opening portion where an article is inserted or removed, the plurality of storage units are arranged with their opening faces facing in the same direction, and the lighting position is set to the opening face of the target storage unit.

According to this configuration, light is emitted to the opening face of the target storage unit, so it is possible to more clearly indicate the target storage unit among the plurality of storage units. Therefore, it is possible to further suppress the occurrence of mistakes by a worker in picking work.

Also, it is suitable to adopt a configuration in which in a vertical direction view viewed in the vertical direction, where the direction in which the plurality of storage units are arranged is an arrangement direction, a side where a worker performs work relative to the support portion in the arrangement direction serves as a working side, and the lighting unit emits light in a direction that, in the vertical direction view, is inclined with respect to a direction orthogonal to the arrangement direction, and is directed more toward the working side as the light moves to the storage unit side.

According to this configuration, it is possible for the lighting unit to emit light on the opening face of the target storage unit in a state in which the article transport vehicle is at a position offset from the target storage unit in the arrangement direction. Therefore, it is possible to more clearly indicate the target storage unit among the plurality of storage units, the article transport vehicle is less likely to become a hindrance when removing an article from the target storage unit, and it is possible for a worker to perform picking work in a state in which the article transport vehicle is less likely to become a hindrance when supporting an article in a support portion.

Also, it is suitable to adopt a configuration in which the plurality of storage units are arranged in a state lined up in the vertical direction, the lighting unit is configured to be capable of emitting light so as to display position information indicating the position of the target storage unit in the vertical direction, the lighting position is set on a floor where the travel unit travels, and the control unit, in the lighting control, controls the lighting unit so as to display the position information at the lighting position.

According to this configuration, by the control unit executing the lighting control, position information of the target storage unit is displayed on the floor, so it is possible to clearly indicate the target storage unit among the plurality of storage units lined up in the vertical direction. Therefore, it is possible to further suppress the occurrence of mistakes by a worker in picking work.

Also, it is suitable to adopt a configuration in which there is further provided a detection unit that detects that an article that has been removed from the target storage unit has been correctly supported in the support portion, the control unit starting the lighting control when execution of the travel control ends, and ending the lighting control when detection is performed by the detection unit.

According to this configuration, by starting the emission of light to the lighting position when travel control ends, it is possible to allow a worker to recognize that there is an article to be removed from the target storage unit, and by ending the emission of light to the lighting position when detection is performed by the detection unit, it is possible to allow the worker to recognize the end of picking work. Therefore, it is possible to improve the efficiency of picking work by the worker.

Also, it is suitable to adopt a configuration in which, in addition to a storage unit that is a removal source where an article to be supported in the support portion is being stored, a storage unit that is a storage destination where an article being supported in the support portion is to be stored also serves as the target storage unit.

According to this configuration, it is possible to emit light to the target storage unit not only in a case where an article is to be removed from a storage unit that is a removal source, but also in a case where an article is to be stored in a storage unit that is a storage destination. Therefore, it is possible to clearly indicate the target storage unit among a plurality of storage units to a worker even in a case where the worker is to store an article in the target storage unit in order to replenish the article or the like.

Also, it is suitable to adopt a configuration in which the lighting unit is configured to be capable of emitting light so as to display storage type information indicating whether the target storage unit is the storage unit that is the removal source or is the storage unit that is the storage destination at the lighting position, and the control unit, in the lighting control, controls the lighting unit so as to display the storage type information according to whether the target storage unit is the storage unit that is the removal source or is the storage unit that is the storage destination at the lighting position.

According to this configuration, light that displays storage type information is emitted to the lighting position, so it is possible to allow a worker to appropriately recognize whether work to be performed with respect to the target storage unit is work of removing an article from the target storage unit or work of storing an article in the target storage unit. Therefore, in this case as well, it is possible to suppress the occurrence of mistakes by the worker.

INDUSTRIAL APPLICABILITY

The technology according to the present disclosure is applicable to an article transport vehicle provided with a support portion that supports an article.

DESCRIPTION OF REFERENCE SIGNS

1: storage unit
1A: target storage unit
8: opening portion
9: opening face
11: travel unit
12: support portion
13: lighting unit
15: control unit
35: detection unit
P1: set position
P2: lighting position
F: floor
M: worker
W: article
X: first direction (arrangement direction)
X1: first direction first side (working side)
Z: vertical direction

The invention claimed is:

1. An article transport vehicle, comprising:
a travel unit that travels to a set position that has been set so as to correspond to each of a plurality of storage units configured to store an article;
a support portion configured to support an article;
a lighting unit that emits light; and
a control unit that controls the travel unit and the lighting unit;
wherein the plurality of storage units includes at least one target storage unit, and the at least one target storage unit is a removal source where an article to be supported in the support portion is being stored, or the at least one target storage unit is a storage destination where an article being supported in the support portion is to be stored,
wherein the control unit executes a travel control that controls the travel unit such that the travel unit travels to the set position that has been set to correspond to the target storage unit, and the control unit further executes a lighting control that controls the lighting unit to emit light to a lighting position that corresponds to the target storage unit
wherein each of the storage units is provided with an opening face having an opening portion where an article is inserted or removed,
wherein the plurality of storage units are arranged with their opening faces facing in the same direction,
wherein in a vertical direction view viewed in a vertical direction, where the direction in which the plurality of storage units are arranged is an arrangement direction, a side where a worker performs work relative to the support portion in the arrangement direction serves as a working side,
wherein the set position is set on an opposite side to the working side with respect to the target storage unit,
wherein the lighting unit emits light in a direction that, in the vertical direction view, is inclined with respect to a direction orthogonal to the arrangement direction, and is directed more toward the working side as the light moves to a storage unit side, and
wherein the lighting unit is further configured to emit light to display number information indicating a number of articles to be removed from the target storage unit at the lighting position, and-the control unit executes the lighting control, and controls the lighting unit to display the number information at the lighting position.

2. The article transport vehicle according to claim 1, wherein the lighting position is set to the opening face of the target storage unit.

3. The article transport vehicle according to claim 1, further comprising:
a detection unit that detects that an article that has been removed from the target storage unit is correctly supported in the support portion, and
wherein the control unit starts execution of the lighting control such that the lighting unit starts emitting light when execution of the travel control ends, and ends execution of the lighting control such that the lighting unit stops emitting light when the detection unit detects that the article is correctly supported in the support position.

4. The article transport vehicle according to claim 1,
wherein the at least one target storage unit is the removal source.

5. The article transport vehicle according to claim 1,
wherein the lighting unit is configured to emit light to display storage type information indicating whether the target storage unit is a removal source or is a storage destination, and
the control unit executes the lighting control and controls the lighting unit to display the storage type information at the lighting position.

6. The article transport vehicle according to claim 1,
wherein the at least one target storage unit is the storage destination.

7. An article transport vehicle, comprising:
a travel unit that travels to a set position that has been set to correspond to each of a plurality of storage units configured to store an article;
a support portion configured to support an article;
a lighting unit that emits light; and
a control unit that controls the travel unit and the lighting unit;
wherein the plurality of storage units includes at least one target storage unit, and the at least one target storage unit is a removal source where an article to be supported in the support portion is being stored, or the at least one target storage unit is a storage destination where an article being supported in the support portion is to be stored,
wherein the control unit executes a travel control that controls the travel unit such that the travel unit travels to the set position that has been set to correspond to the target storage unit,
wherein
the plurality of storage units are arranged in a state lined up in the vertical direction,
wherein the lighting unit is configured to emit light to display position information indicating the position of the target storage unit in the vertical direction,
wherein the control unit further executes a lighting control and controls the lighting unit to emit light to a lighting position and to display the position information at the lighting position, and
wherein the lighting position corresponds to the target storage unit and is set on a floor where the travel unit travels, and
wherein the lighting unit is further configured to emit light to display number information indicating a number of articles to be removed from the target storage unit at the lighting position, and the control unit executes the lighting control, and controls the lighting unit to display the number information at the lighting position.

8. The article transport vehicle according to claim 7, further comprising:
a detection unit that detects that an article that has been removed from the target storage unit is correctly supported in the support portion, and
wherein the control unit starts execution of the lighting control such that the lighting unit starts emitting light when execution of the travel control ends, and ends execution of the lighting control such that the lighting unit stops emitting light when the detection unit detects that the article is correctly supported in the support position.

9. The article transport vehicle according to claim 7,
wherein the at least one target storage unit is the removal source.

10. The article transport vehicle according to claim 7,
wherein the lighting unit is configured to emit light to display storage type information indicating whether the target storage unit is a removal source or is a storage destination, and
the control unit, executes the lighting control and controls the lighting unit to display the storage type information at the lighting position.

11. The article transport vehicle according to claim 7,
wherein the at least one target storage unit is the storage destination.

\* \* \* \* \*